United States Patent
Shemtov

(10) Patent No.: US 6,939,160 B2
(45) Date of Patent: Sep. 6, 2005

(54) EMT RAIN-TIGHT COMPRESSION FITTINGS

(75) Inventor: Sami Shemtov, Aventura, FL (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 10/959,076

(22) Filed: Oct. 7, 2004

(65) Prior Publication Data

US 2005/0037657 A1 Feb. 17, 2005

Related U.S. Application Data

(63) Continuation of application No. 09/884,038, filed on Jun. 20, 2001, now Pat. No. 6,835,088.

(51) Int. Cl.[7] .............................................. H01R 13/62
(52) U.S. Cl. ...................................... 439/363; 439/272
(58) Field of Search ........................... 174/21 R, 21 JS, 174/84 R; 285/81, 93, 322, 323, 314; 439/271–275, 363

(56) References Cited

U.S. PATENT DOCUMENTS

| | | |
|---|---|---|
| 3,603,912 A | 9/1971 | Kelly |
| 3,836,700 A | 9/1974 | Neimeyer |
| 4,116,472 A | 9/1978 | Schmitt |
| 4,194,768 A | 3/1980 | Gretz |
| 4,679,827 A | 7/1987 | Law |
| 5,068,494 A | 11/1991 | Bolante |
| 5,072,072 A | 12/1991 | Bawa et al. |
| 5,165,735 A | 11/1992 | Nardi et al. |
| 5,200,575 A | 4/1993 | Sheehan |
| 5,340,163 A | 8/1994 | Merrer et al. |
| 5,496,076 A | 3/1996 | Lin |
| 6,056,326 A | 5/2000 | Guest |

Primary Examiner—Khiem Nguyen
(74) Attorney, Agent, or Firm—Fish & Richardson P.C.

(57) ABSTRACT

A connector assembly includes a nut, a first member, a second member, and a third member. The connector assembly is used for coupling a conduit to an electrical device that includes a body having an end with an outer edge and a threaded exterior surface. The nut includes a first angled end, a second threaded end, and an inner cavity between the first angled end and the second threaded end. The nut is configured to be threadably attached to the threaded exterior surface of the body. The first member includes a first edge, a second edge, and is positioned within the cavity and encloses the conduit when the conduit is connected to the body. The second member includes a first edge, a second edge, and is positioned within the cavity and encloses the conduit when the conduit is connected to the body. The third member includes a first edge, a second edge, and is positioned within the cavity and encloses the conduit when the conduit is connected to the body. When the nut is threadably attached to the body, the first edge of the first member slidably mates with the first angled end of the nut, the second edge of the first member is in contact with the first edge of the second member, the second edge of the second member is in contact with the first edge of the third member, and the second edge of the third member slidably mates with the outer edge of the end of the body.

6 Claims, 10 Drawing Sheets

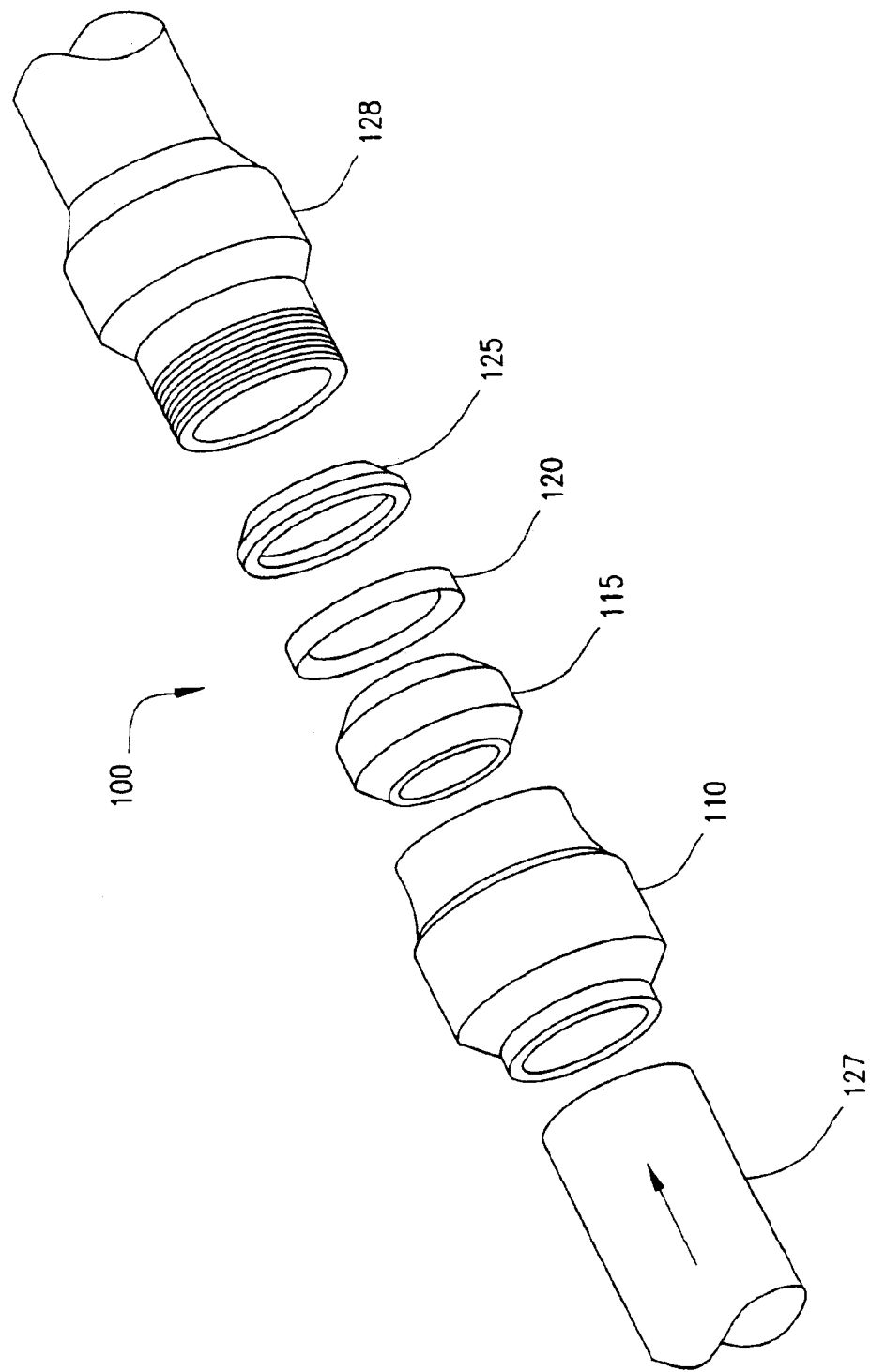

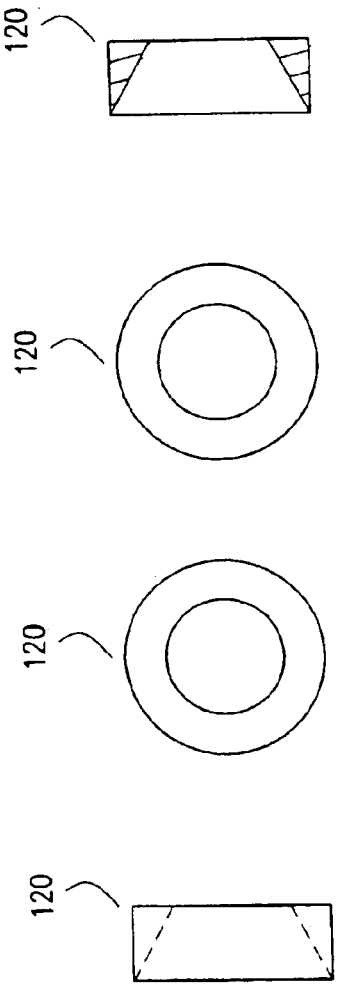
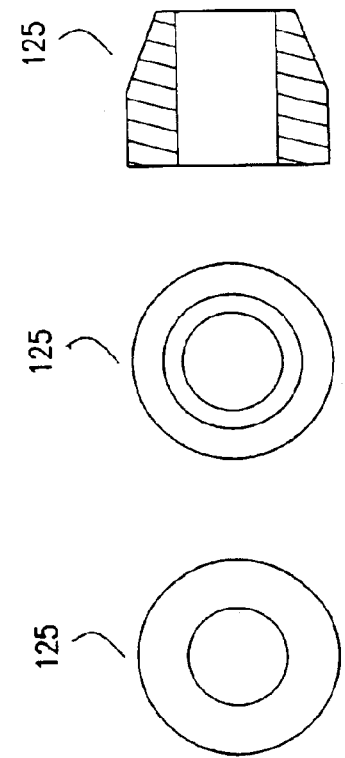
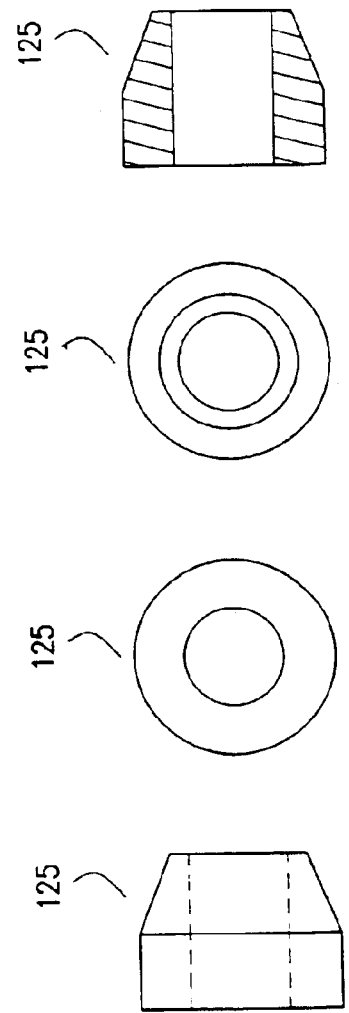

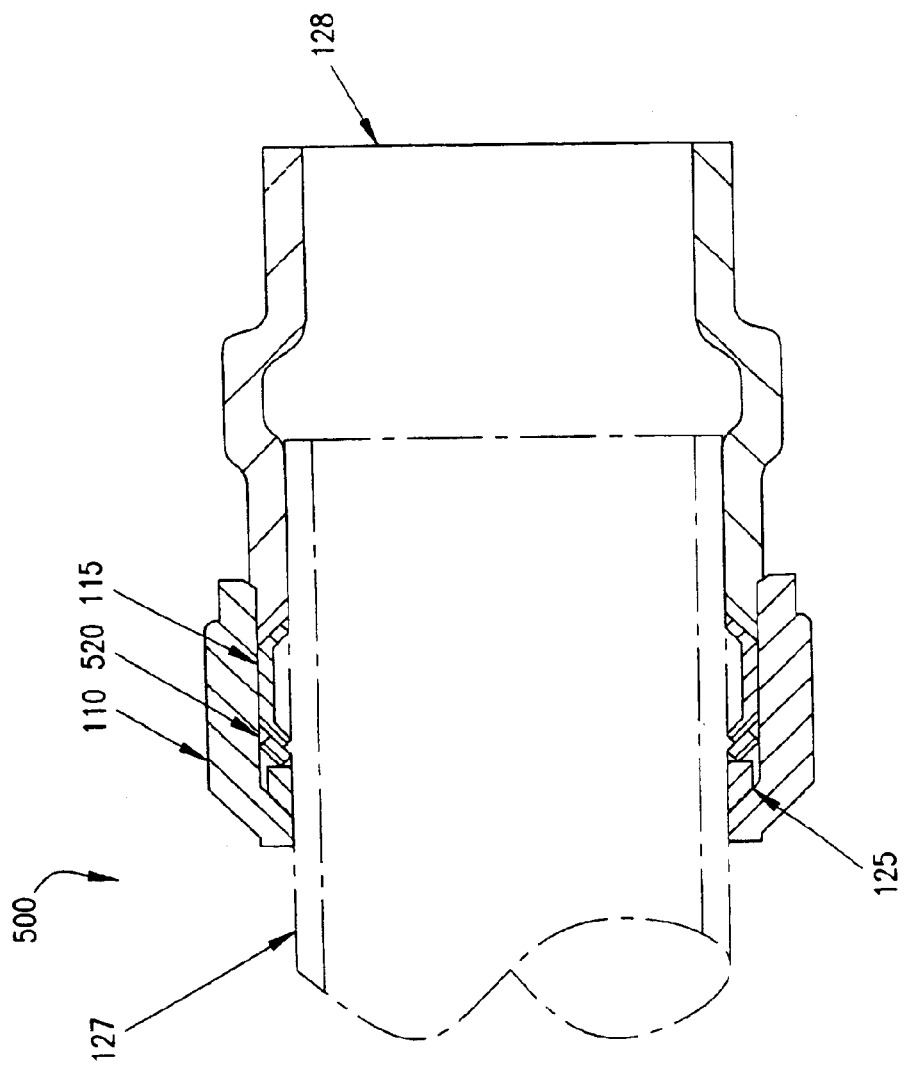

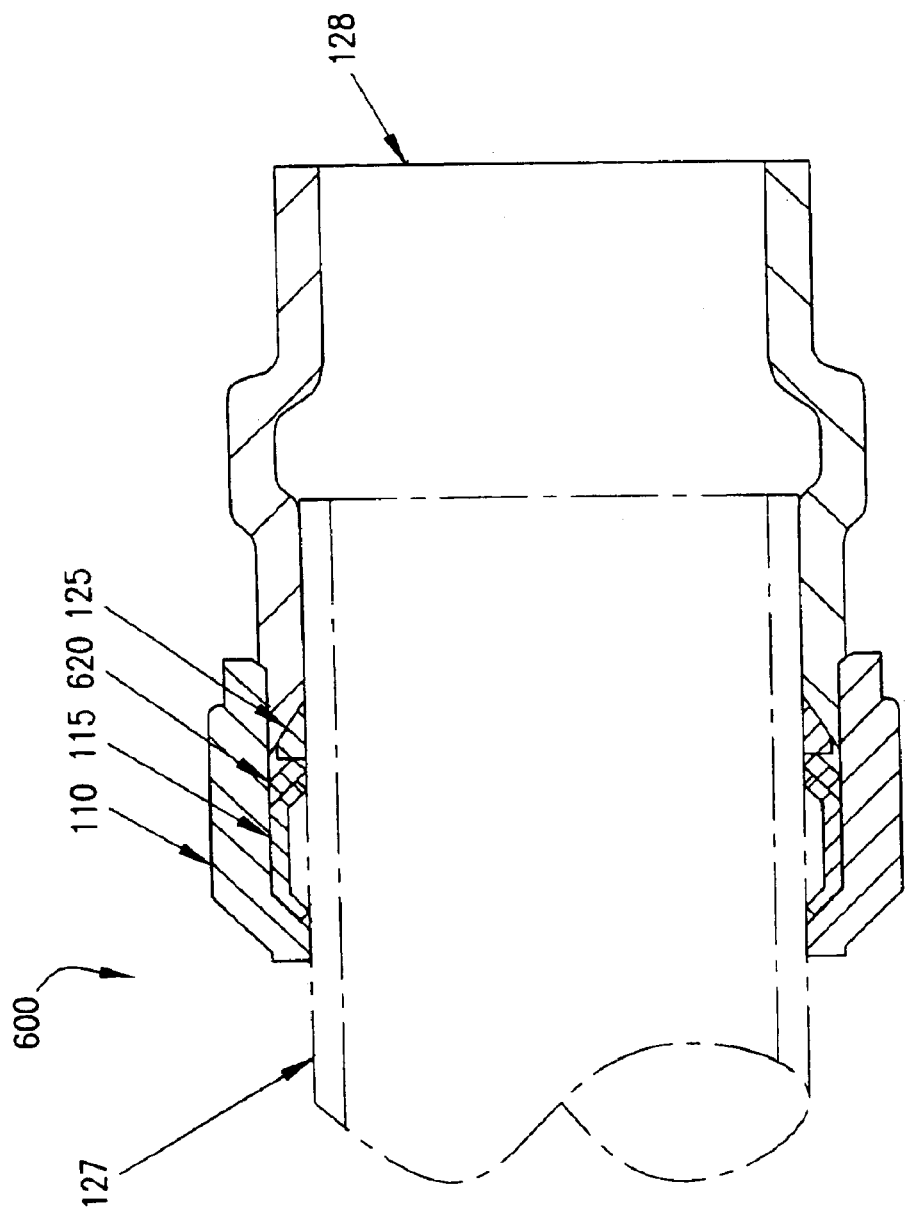

EMT RAIN-TIGHT COMPRESSION FITTINGS

CROSS-REFERENCE TO RELATED APPLICATIONS

This application is a continuation of and claims priority to U.S. application Ser. No. 09/884,038, filed on Jun. 20, 2001 now U.S. Pat. No. 6,835,088, now allowed.

TECHNICAL FIELD

This invention relates to rain-tight compression fittings, and more particularly to fluid-tight compression fittings for electrical metallic tubing.

BACKGROUND

Electrical metallic tubing ("EMT") conduit is a metal conduit that encases electrical wiring. Typically, the conduit is thin-walled and non-threaded. The EMT conduit is used to enclose electrical wires in, for example, warehouses and manufacturing facilities where the wiring may be run along the walls and the ceiling such that the conduit is exposed. Where the electrical wiring and the surrounding EMT conduit connect to an electrical device, such as a motor, transformer, or fuse box, there must be a rain-tight seal between the EMT conduit and the electrical device. Typically, a ring is used to connect the EMT conduit to an EMT body, which may be a connector protruding from the electrical device. When the rain-tight seal is formed, an electrical ground continuity between the EMT conduit and the EMT body also may be formed.

SUMMARY

In one general aspect, a connector assembly includes a nut, a first member, a second member, and a third member. The connector assembly is used for coupling a conduit to an electrical device that includes a body having an end with an outer edge and a threaded exterior surface. The nut includes a first angled end, a second threaded end, and an inner cavity between the first angled end and the second threaded end. The nut is configured to be threadably attached to the threaded exterior surface of the body. Each of the first, second, and third members includes first and second edges, is positioned within the cavity, and encloses the conduit when the conduit is connected to the body. When the nut is threadably attached to the body, the first edge of the first member slidably mates with the first angled end of the nut, the second edge of the first member is in contact with the first edge of the second member, the second edge of the second member is in contact with the first edge of the third member, and the second edge of the third member slidably mates with the outer edge of the end of the body.

Implementations may include one or more of the following features. For example, the first member may include a compression ring, the second member may include a friction washer, and the third member may include a sealing ring. The first member may include a sealing ring, the second member may include a friction washer, and the third member may include a compression ring.

The first member may include a first wall including the first edge of the first member, a second wall including the second edge of the first member, and a top wall, and, when the nut is threadably attached to the body, one or both of the first wall and the second wall are in a penetrating contact with an outer surface of the conduit.

The third member may include the first edge of the third member, the second edge of the third member, a third edge connecting the first edge of the third member and the second edge of the third member, and a fourth edge connecting the first edge of the third member and the second edge of the third member, and, when the nut is threadably attached to the body, the third edge of the third member is compressed against the conduit. The fourth edge may be compressed against the nut.

The second member may include a third edge connecting the first edge of the second member and the second edge of the second member and, when the nut is threadably attached to the body, the third edge of the second member is compressed against the nut. The second member may have a triangular or rectangular cross-section.

One of the first edge of the first member and the second edge of the third member may form a fluid-tight seal against the conduit. One of the first edge of the first member and the second edge of the third member may form an electrical ground continuity between the conduit and the nut. The conduit may be an EMT conduit and the body may be an EMT body.

In another general aspect, coupling a conduit to an electrical device includes providing a body having an end with an outer edge and a threaded exterior surface, providing a conduit, providing a connector assembly including a nut, and threadably attaching the nut to the body. The connector assembly includes the nut, a first member, a second member, and a third member. The nut includes a first angled end, a second threaded end, and an inner cavity defined between the first angled end and the second threaded end, the nut being configured to be threadably attached to the threaded exterior surface of the body. The first member includes a first edge, a second edge, is being positioned within the cavity and configured to enclose the conduit when the conduit is connected to the body. The second member includes a first edge, a second edge, and is positioned within the cavity and configured to enclose the conduit when the conduit is connected to the body. The third member includes a first edge, a second edge, and is positioned within the cavity and configured to enclose the conduit when the conduit is connected to the body.

Implementations may include any of the features described above.

The connector assembly provides considerable advantages. For example, the connector assembly provides a fluid-tight seal, an electrical ground continuity, and a strong joint between an EMT conduit and an EMT body in which the EMT conduit is installed. The strong joint resists pulling the conduit from the body. The components of the connector assembly are relatively simple, and are easily and inexpensively produced, such that the connector assembly may be inexpensive and easy to use.

The details of one or more implementations are set forth in the accompanying drawings and the description below. Other features and advantages will be apparent from the description, the drawings, and the claims.

DESCRIPTION OF DRAWINGS

FIG. 3 is an exploded perspective view of FIG. 2.

FIGS. 12–15 are side, bottom, top, and cross-sectional side views of the friction washer of FIG. 3.

FIGS. 16–19 are side, bottom, top, and cross-sectional side views of the sealing ring of FIG. 3.

FIGS. 23 and 24 are cross-sectional side views of a connector assembly having a rectangular friction washer.

Like reference symbols in the various drawings indicate like elements.

DETAILED DESCRIPTION

Figure 1:
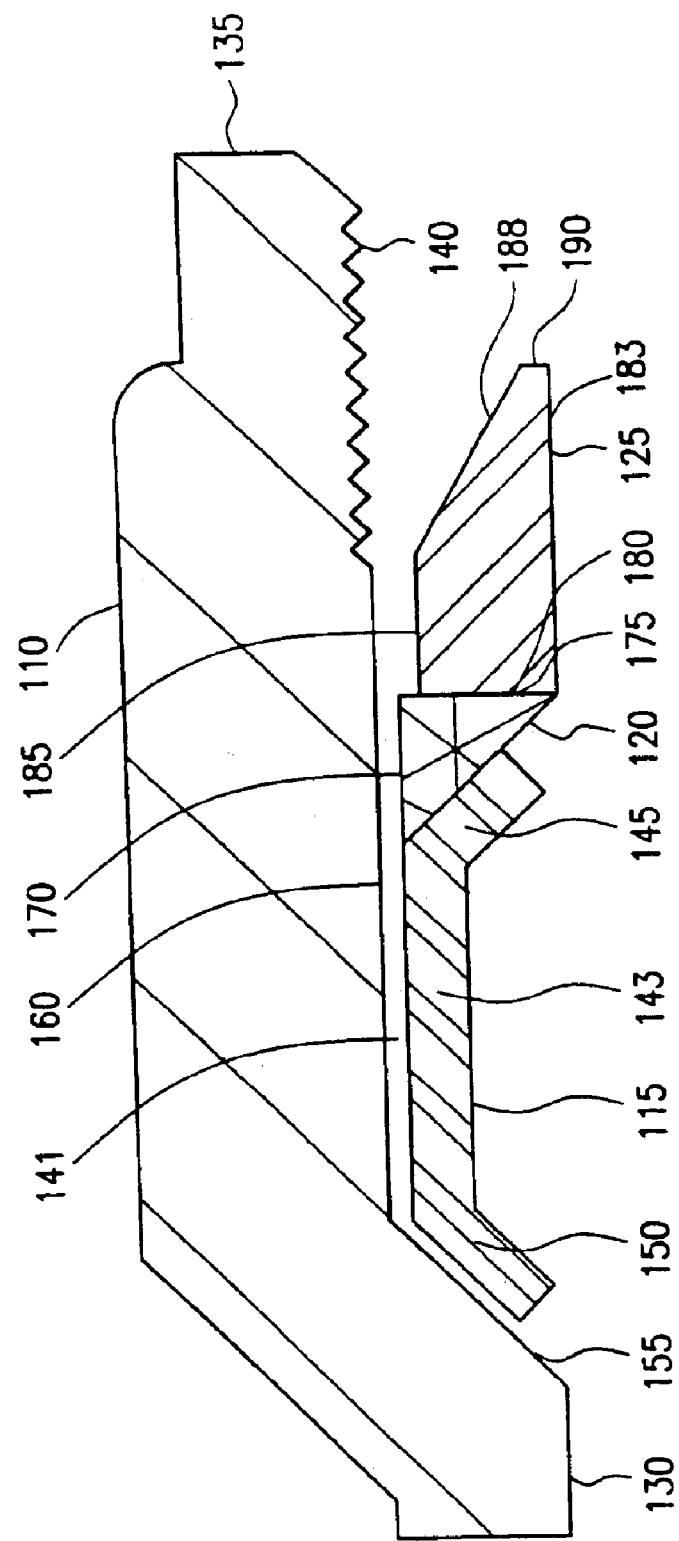
FIG. 1 is a cross-sectional side view of a connector assembly.
Figure 2:
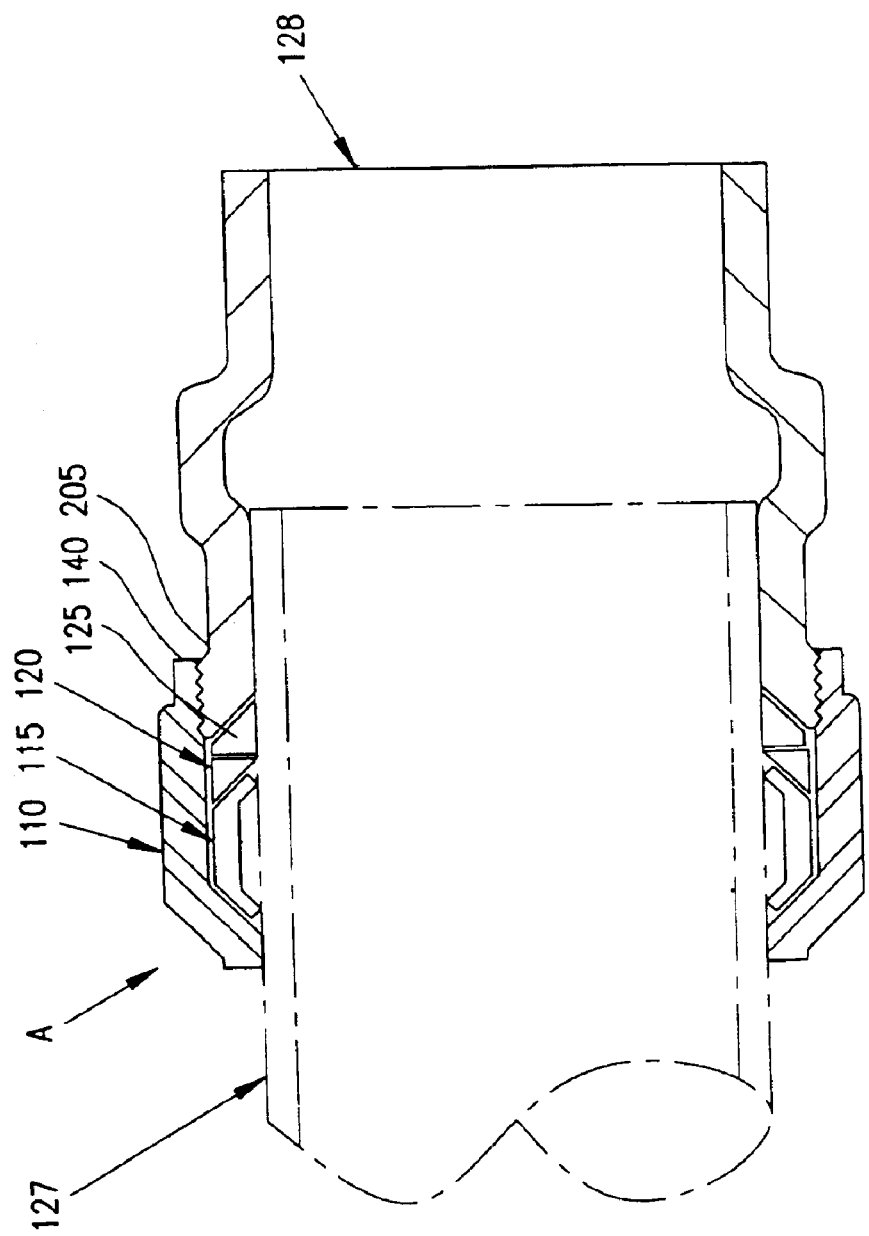
FIGS. 2 is a cross-sectional side view of the connector assembly of FIG. 1 being used to connect an EMT conduit to an EMT body.
Figure 6:
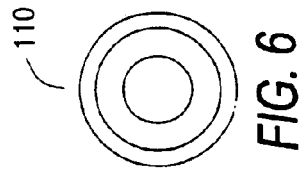
FIGS. 4–7 are side, bottom, top, and cross-sectional side views of the EMT nut of FIG. 3.
Figure 7:
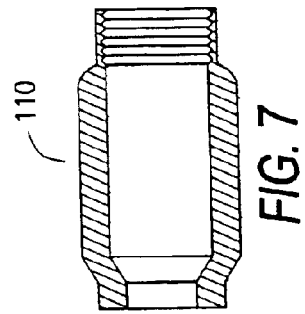
Figure 11:
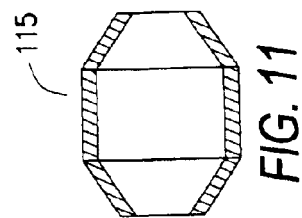
FIGS. 8–11 are side, bottom, top, and cross-sectional side views of the compression ring of FIG. 3.
Figure 5:
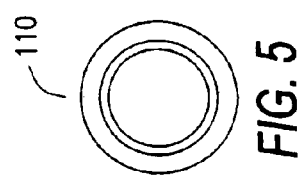
Figure 9:
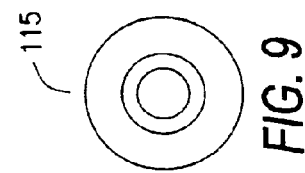
Figure 10:
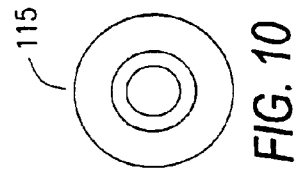
Figure 4:
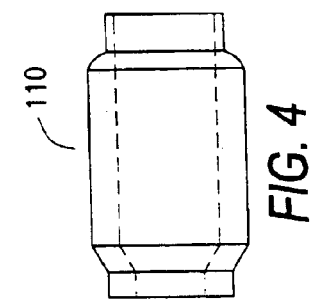
Figure 8:
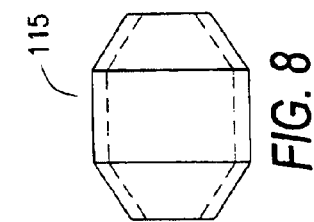

Referring to FIGS. 1–3, an EMT rain-tight compression fitting 100 includes an EMT nut 110, a compression ring 115, a friction washer 120, and a sealing ring 125. The fitting 100 is used to provide a fluid-tight seal and an electrical ground continuity between an EMT conduit 127 and an EMT body 128.

Referring to FIGS. 4–7, the EMT nut 110 is an elongated, annular ring designed to fit over the EMT conduit and the EMT body 128. The EMT nut 110 has a tapered end 130 and a wide end 135. The wide end 135 has an interior threaded region 140. The EMT nut 110 is designed to envelope the compression ring 115, the friction washer 120, and the sealing ring 125 inside a cavity 141.

Referring to FIGS. 8–11, the compression ring 115 is a generally circular ring and includes a flat portion or wall 143, a leading edge or wall 145 and a lagging edge or wall 150. The leading edge 145 and the lagging edge 150 are angled downward towards the center of the compression ring 115. The lagging edge 145 is configured to slidably contact an angled surface 155 of the EMT nut 110. The flat portion 143 is configured to slidably contact an interior surface 160 of the EMT nut 110. The leading edge 145 is configured to contact a beveled surface 165 of the friction washer 120.

Referring to FIGS. 12–15, the friction washer 120 also has a flat top surface 170 and a flat front surface 175. The top surface 170 is configured to contact the interior surface 160 of the EMT nut 110 and the front surface 175 is configured to contact a wide edge 180 of the sealing ring 125.

Referring to FIGS. 16–19, in addition to the wide edge 180, the sealing ring 125 also has an interior edge 183, an exterior edge 185, an angled edge 188 and a narrow edge 190.

Generally, the EMT nut 110, the compression ring 115, and the friction washer 120 may be made of metal or other rigid, conductive materials. The sealing ring 125 may be made of rubber or another resilient material.

Referring to FIGS. 2 and 3, an EMT rain tight compression assembly 200 includes the EMT conduit 127, the EMT body 128, and the EMT rain tight compression fitting 100 illustrated in FIG. 1, including the EMT nut 110, the compression ring 115, the friction washer 120, and the sealing ring 125. The EMT conduit 127 generally includes a tubular, metallic conduit for use with electrical and other types of wiring. The EMT body 128 may include or be a part of, for example, a junction box, an electrical panel, or another termination or splicing point for electrical wiring.

The EMT rain-tight compression fitting 100 sealably joins the EMT conduit 127 and the EMT body 128 to form a rain-tight seal and a strong joint that resists removal of the conduit from the body. The threaded region 140 of the EMT nut 110 is threadably attached to mating threads 205 on the EMT body 128, causing the angled surface 155 of the EMT nut 110 to apply force to the compression ring 115 in the direction of arrow A. The compression ring 115 then is forced into the friction washer 120, which, in turn, is forced into the sealing ring 125.

Generally, the EMT rain-tight compression assembly 200 is configured such that a first member (e.g., the compression ring) has an angled edge that is configured to slidably mate with an angled edge of the EMT nut, a second member (e.g., the sealing ring) has an angled edged that is configured to slidably mate with an angled edge of the EMT body, and a third member (e.g., the friction washer) is configured to have a first surface that contacts an edge of the first member and a second surface that contacts an edge of the second member.

In this manner, when the EMT nut is threadably tightened to the EMT body, the angled edge of the first member is forced against the angled edge of the EMT nut and the other edge of the first member is forced against the first edge of the third member. This, in turn, forces the second edge of the third member against an edge of the second member, which forces the angled edge of the second member against the angled edge of the EMT body. The end result of these interactions is a rain-tight and moisture tight seal with an electrical ground continuity formed between the EMT conduit and the EMT body. Moreover, the rain-tight seal can be formed at the interface of the EMT conduit and the EMT body or at the interface of the EMT conduit and the EMT nut, depending upon the arrangement of the first, second, and third members within the EMT nut. Similarly, the electrical ground continuity can be formed by the member that is adjacent to the interface of the EMT conduit and the EMT nut, depending upon the arrangement of the first, second, and third members within the EMT nut.

Figure 20:
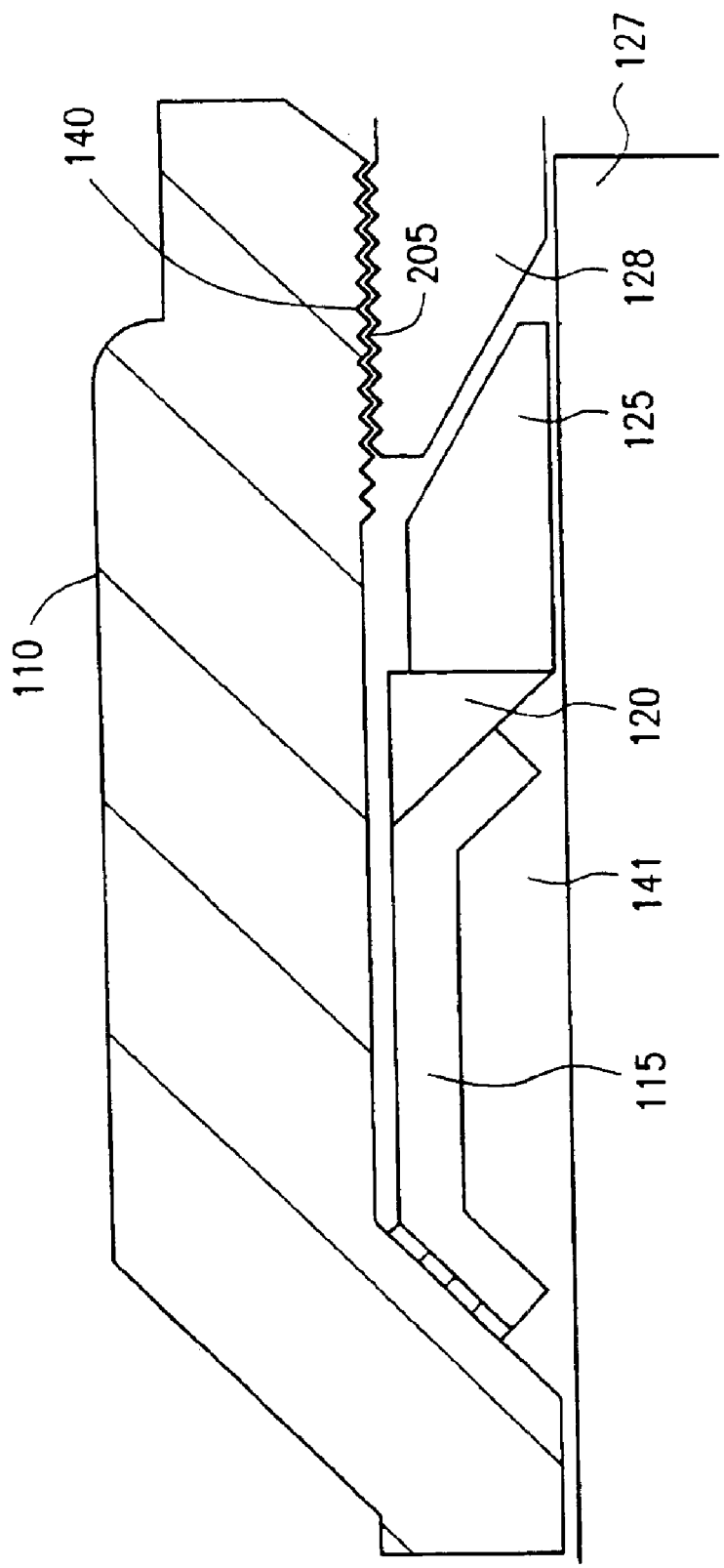
FIGS. 20 and 21 are cross-sectional side views of the connector assembly of FIG. 1 being used to connect an EMT conduit to an EMT body.
Figure 21:
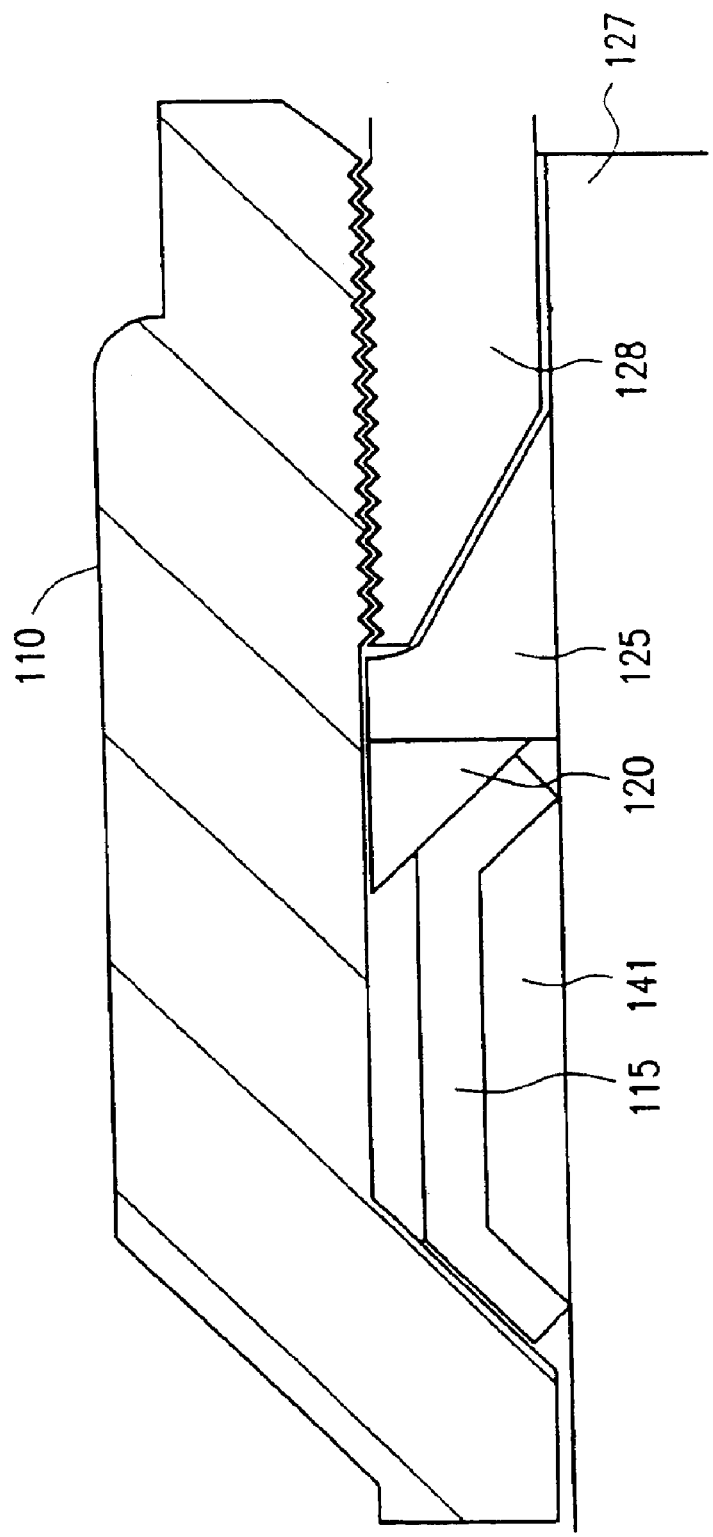

FIGS. 20 and 21 show the effects of tightening the EMT nut 110 to seal the EMT rain tight compression assembly 200 shown in FIG. 2. Referring to FIG. 20, the components of the EMT rain tight compression assembly 200 are shown prior to tightening the EMT nut 110 (Position A). In Position A, the threads 205 of the EMT body 128 are not fully engaged with the threaded region 140 of the EMT nut 110. In Position A, no pressure or forces are applied to the compression ring 115, the friction washer 120, or the sealing ring 125.

Referring to FIG. 21, the components of the EMT rain tight compression assembly 200 are shown with the EMT nut 110 tightened to the EMT body 128 (Position B). In Position B, the threads 205 of the EMT body 128 are fully engaged with the threaded region 140 of the EMT nut 110 causing the cross-sectional area of the cavity 141 to be reduced. The sealing ring 125 is compressed between the EMT body 128 and the friction washer 120 causing the sealing ring to expand against the EMT nut 110 and the EMT conduit. The sealing ring 125 seals the cavity 141 from penetration by rain and moisture. The friction washer 120 is forced to ride up the leading edge 145 of the compression ring 115 causing the leading edge 145 to penetrate the surface of the EMC conduit 127. Thus, in Position B, a firm joint is achieved and electrical ground conductivity is established or improved.

Figure 22:
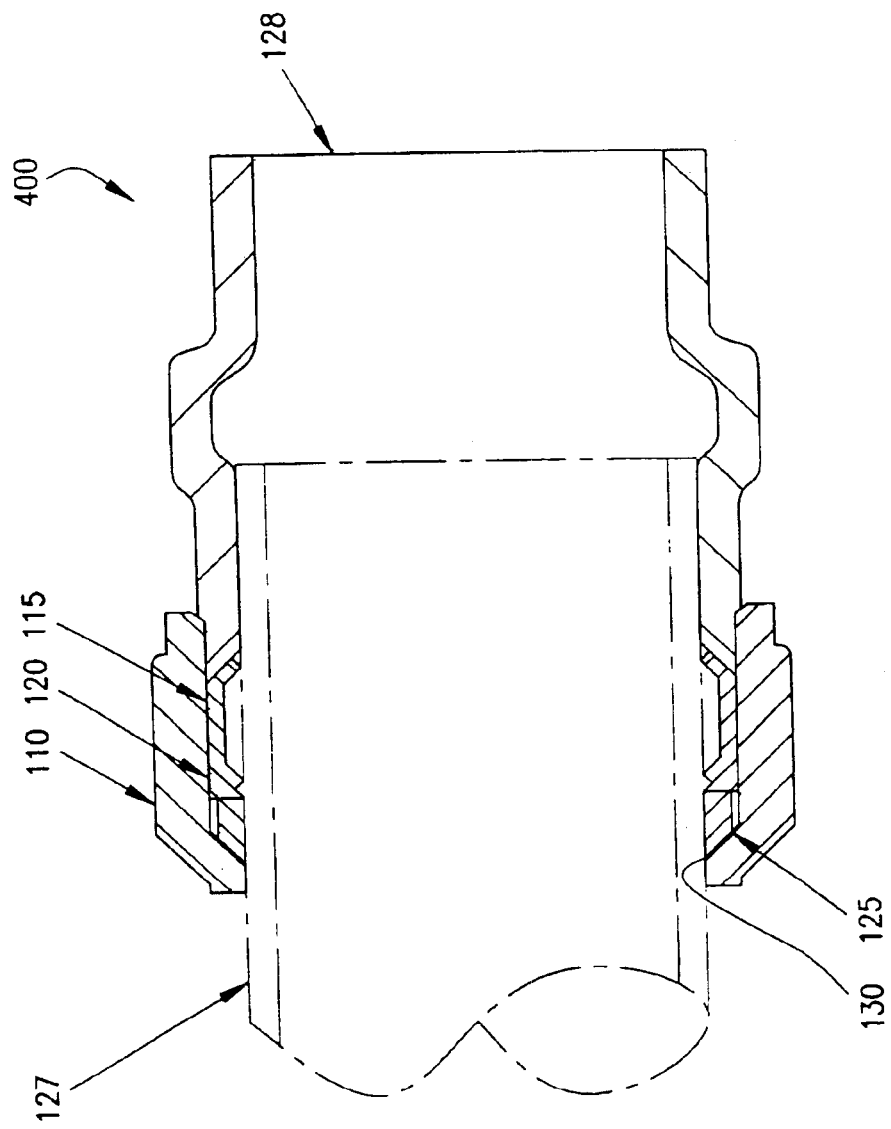
FIG. 22 is a cross-sectional side view of a modified version of the connector assembly of FIG. 1.

Referring to FIG. 22, another implementation of an EMT rain tight compression assembly 400 includes the EMT nut 110, the compression ring 115, the friction washer 120, the sealing ring 125, the EMT conduit 127, and the EMT body 128. In this implementation, the order of the components inside the cavity 141 is changed. As shown, the sealing ring 125 contacts the EMT nut 110 and the compression ring 115 contacts the EMT body 128. The friction washer 120 is placed between the sealing ring 125 and the compression ring 115, with a side of the friction washer 120 resting on the compression ring 115.

When the EMT nut 110 is threadably attached and tightened to the EMT body 128, the cross-sectional area of the cavity 141 is reduced, which forces the sealing ring 125 against the friction washer 120 and the friction washer 120 against the compression ring 115. The sealing ring 125 is compressed against the tapered end 130 to form to a rain-tight and moisture-tight seal between the EMT conduit 127 and EMT nut 110. The compression ring 115 is compressed such that the leading edge 145 and the lagging edge 150 are forced into the EMT conduit 127 and the flat edge 143 is pressed against the interior surface 160 of the EMT nut 110. The penetration by the edges 145 and 150 and the pressure exerted by the flat edge 143 provide two results. First, they form an electrical ground continuity between the EMT conduit 127 and the EMT body 128. Second, they cause the EMT conduit to be held firmly in place within the EMT body.

Referring to FIG. 23, another implementation of an EMT rain tight compression assembly 500 includes the EMT nut 110, the compression ring 115, a friction washer 520, the sealing ring 125, the EMT conduit 127, and the EMT body 128. In this implementation, the compression ring 115 contacts the EMT body 128, the sealing ring 125 contacts the EMT nut 110, and the friction washer 520 is placed between the compression ring 115 and the sealing ring 125. As shown, the friction washer 520 has a rectangular cross-section and rests lengthwise on the leading edge 145 of the compression ring 115.

Tightening the EMT nut 110 on the EMT body 128 reduces the cross-sectional area of the cavity 141. As a result, the angled surface 155 of the EMT nut 110 presses against the angled edge 188 of the sealing ring 125. The wide edge 180 of the sealing ring then is forced against a corner of the rectangular friction washer 520, which forces an edge or side of the rectangular friction washer 520 against the leading edge 145 of the compression ring. This force, in turn, forces the lagging edge 150 against the angled edge of the EMT body 128. As a consequence of these interactions, the angled edge 188 of the sealing ring 125 is pressed into the interface between the tapered end 130 of the EMT nut 110 and the outer surface of the EMT conduit 127, which forms a rain-tight and moisture-tight seal. The leading edge 145 and the lagging edge 150 of the compression ring 115 are pressed into the EMT conduit and the flat edge is pressed against the interior surface 160 of the EMT nut 110, which forms a tight joint and an electrical ground continuity.

Referring to FIG. 24, another implementation of an EMT rain tight compression assembly 600 includes the EMT nut 110, the compression ring 115, a friction washer 620, the sealing ring 125, the EMT conduit 127, and the EMT body 128. In this implementation, the order of the components is changed relative to the compression assembly 500, with the compression ring 115 contacting the EMT nut 110, the rectangular friction washer 620 resting on the leading edge 145 of the compression ring 115, and the sealing ring 125 contacting the EMT body 128. Again, like the assembly 500, the assembly 600 provides a rain-tight and moisture-tight seal and a tight joint that retains the EMT conduit 127 within the EMT body 128.

Other implementations are within the scope of the following claims.

What is claimed is:

1. A connector assembly for coupling a conduit to an electrical device comprising a body having an end with an outer edge and a threaded exterior surface, the connector assembly comprising:
   a conductive nut comprising a first angled end, a second threaded end, and an inner cavity defined between the first angled end and the second threaded end, the nut being configured to be threadably attached to the threaded exterior surface of the body;
   a first conductive member comprising a first edge and a second edge, and being positioned within the cavity and configured to enclose at least a portion of the conduit when the conduit is connected to the body;
   a second conductive member comprising a first edge and a second edge, and being positioned within the cavity and configured to enclose at least a portion of the conduit when the conduit is connected to the body; and
   a first resilient member comprising a first edge and a second edge, and being positioned within the cavity and configured to enclose at least a portion of the conduit when the conduit is connected to the body;
   wherein, when the nut is threadably attached to the body, the first edge of the first conductive member slidably mates with the first angled end of the nut, the second edge of the first conductive member slidably mates with the first edge of the second conductive member, the second edge of the second conductive member is in contact with the first edge of the first resilient member, and the second edge of the first resilient member mates against the outer edge of the end of the body, and
   wherein, when the nut is threadably attached to the body, a portion of the first conductive member penetrates an outer surface of the conduit.

2. The connector assembly of claim 1 wherein the first conductive member comprises a compression ring, the second conductive member comprises a friction washer, and the first resilient member comprises a sealing ring.

3. The connector assembly of claim 1 wherein the conductive nut comprises a metal, wherein first conductive member comprises a metal, and wherein the second conductive member comprises a metal.

4. The connector assembly of claim 1 wherein the conduit is conductive.

5. The connector assembly of claim 4 wherein when the nut is threadably attached to the body, when the first edge of the first conductive member slidably mates with the first angled end of the nut, and when the second edge of the first conductive member is in contact with the first edge of the second conductive member, then the body, the conduit, and the nut are in electrical contact.

6. The connector assembly of claim 1 wherein the first resilient member comprises rubber.

* * * * *